United States Patent [19]
Fredriksson

[11] 3,833,479
[45] Sept. 3, 1974

[54] METHODS AND MEANS FOR DISTILLATION OF LIQUIDS

[75] Inventor: Carl Otto Fredriksson, Goteborg, Sweden

[73] Assignee: Nordnero AB, Goteborg, Sweden

[22] Filed: Sept. 5, 1972

[21] Appl. No.: 286,257

[52] U.S. Cl. ............ 202/235, 159/4 CC, 159/4 K, 159/48 L, 202/236, 203/49
[51] Int. Cl. ........ B01d 3/34, B01d 3/28, B01d 3/00, B01d 1/16, B01d 3/08
[58] Field of Search...... 159/4 K, 24 A, 4 CC, 48 L; 202/234, 236, 235; 203/10, 11, 49, 100, 100 DC, 89

[56] References Cited
UNITED STATES PATENTS

| | | | |
|---|---|---|---|
| 2,444,527 | 7/1948 | Pomeroy | 260/412.5 |
| 3,411,992 | 11/1968 | Mitchell | 203/11 |
| 3,456,709 | 7/1969 | Vegeby | 159/48 X |

FOREIGN PATENTS OR APPLICATIONS

| | | | |
|---|---|---|---|
| 24,930 | 12/1956 | Germany | 159/4 K |
| 683,480 | 3/1964 | Canada | 203/10 |
| 894,936 | 4/1962 | Great Britain | 203/10 |
| 1,261,066 | 4/1961 | France | 202/234 |

Primary Examiner—Jack Sofer
Attorney, Agent, or Firm—Young & Thompson

[57] ABSTRACT

A method for distillation of liquids comprises the use of two separate liquid circulation systems. The liquid of the first system passes from a tank through a heat exchanger and is then brought to an evaporator there meeting a counter running, colder gas flow and is therefrom returned to the tank. The liquid of the second system passes a condenser and meets there the same counter running gas flow, which then has passed the evaporator, this liquid receiving heat through the gas flow, which heat is emitted to the heat exchanger.

2 Claims, 2 Drawing Figures

METHODS AND MEANS FOR DISTILLATION OF LIQUIDS

The present invention relates to methods and means for distillation of liquids.

It is an object of the present invention to provide a method in which only simple and cheap means are required.

It is another object of the invention to provide a method in which good heat economy is achieved.

The above and other objects, features and advantages of the invention will be more readily understood when the following detailed description is taken in conjunction with the accompanying drawings wherein.

Figure 1:
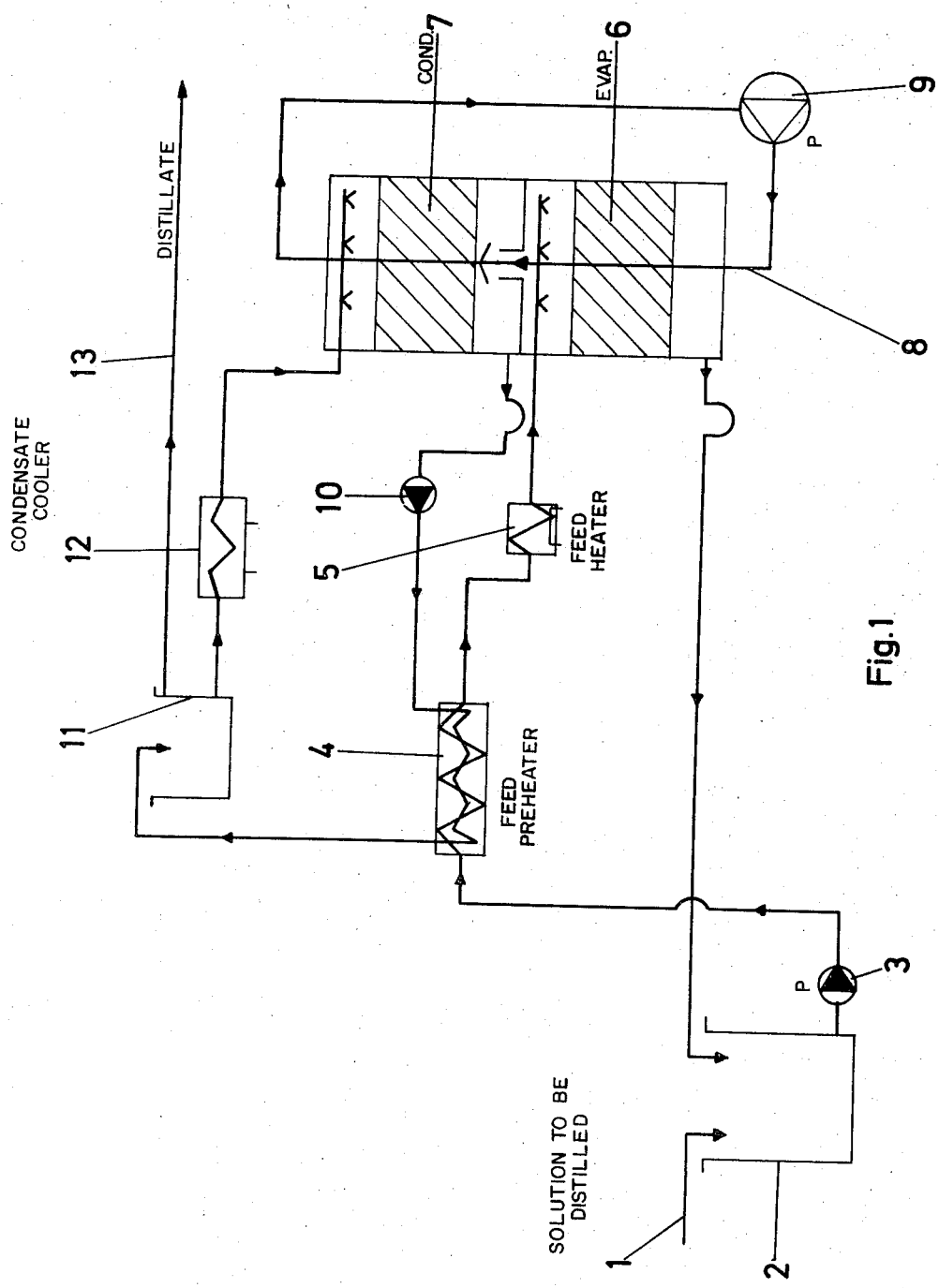
FIG. 1 is a flow diagram according to a first embodiment of the invention.

The solution to be distilled is supplied to a tank 2 through a pipe 1. By means of a pump 3 the solution is pumped through a heat exchanger 4 and a heater 5 to receive heat and is then supplied to an evaporator 6 which together with a condenser 7 are made as two towers placed one above the other with the condenser uppermost. These towers are filled with surface increasing means. The solution enters the evaporator 6 at the top and passes downwards to the bottom, from which the solution is returned to the tank 2. On its way through the evaporator 6 the solution meets a colder gas flow 8, which by means of a fan 9 is pressed upwards through the evaporator 6 and the condenser 7 and is returned from the lastmentioned part to the fan 9.

When passing the evaporator 6 the solution emits heat to the gas flow 8, which will be practically saturated with moisture at a temperature corresponding to that of the supplied solution. The volume of the solution is thereby decreased through evaporation, so that a smaller quantity leaves the bottom of the evaporator 6 than is supplied to its top.

Described above is a first liquid circulation system. In another such system a liquid flow is supplied to the top of the condenser 7 and passes downwards through this part to be brought out at its bottom. This liquid is transported by means of a pump 10 through the heat exchanger 4 to a tank 11, from which it is returned to the top of the condenser 7 via a cooler 12, which cools the liquid to the temperature intended. Through a pipe 13 the distillate is obtained.

When the gas flow 8 passes through the condenser 7 it is cooled by the counter running liquid and leaves the condenser 7 at a temperature corresponding to that of the supplied liquid. During the cooling steam will be condensed and the volume of the liquid is increased. The gas, which has passed the condenser 7, is returned, as mentioned before, to the fan 9, which forces the gas in circulation. This means that the temperature of the gas 8 when entering the evaporator 6 is practically the same as its temperature when leaving the condenser 7 and thus the volume increase of the liquid in the condenser 7 is equal to the volume decrease of the liquid in the evaporator 6. The temperature of the liquid from the condenser 7 may, through adjustment of the liquid quantity, be brought close to the temperature of the liquid supplied to the evaporator 6.

When the liquid from the condenser 7 passes thru the indirect heat exchanger 4 it transmits heat to the counter running solution from the tank 2. The heat exchange in the heat exchanger 4, which is not complete, means that heat has to be applied from outside in order to achieve an energy balance. This is done in the heater 5, which also is necessary to start the process.

The evaporation of the liquid in the evaporator 6 is caused by saturation of the gas flow 8 with the steam of the liquid. Through giving this steam a partial pressure which corresponds to saturation at the temperature the gas has at the different heights in the evaporator 6 and at the same time having the same conditions during the condensation in the condenser 7, the mode of operation will be the same as when using multistage evaporation and good heat economy will be the result.

The apparatus works at atmospheric pressure and the evaporator 6 and the condenser 7, formed as towers, can be made of plastic. The control means will be of simple type. The movable components consist of centrifugal pumps and fans, which are easily operated, reliable and cheap to buy.

The cooler 12 can be made as a cooling tower. When such a tower having direct flow through cannot be used, indirect cooling may be arranged, e.g. by means of a coolant circulation between a cooling tower and a cooler corresponding to 12. If a two- or multiphase system is received as a distillate a separating device may be connected to the system.

The method described above can be used to desalt sea water. The tank 2 is then substituted by the sea, the pipe 1 thereby being eliminated. The return pipe from the evaporator 6, which pipe contains a concentrated solution, is then connected to another place than the intake for the salt water. The pipe 13 delivers the desalted water.

In order to have good heat economy the liquid leaving the evaporator must have low temperature and the gas-steam mixture high temperature and a high degree of saturation. As the ability of a gas to absorb vapor is better at high than at low temperatures the two conditions above cannot be combined if one and the same liquid flow respectively one and the same gas flow passes the evaporator. This is the case in the embodiment described above.

Figure 2:
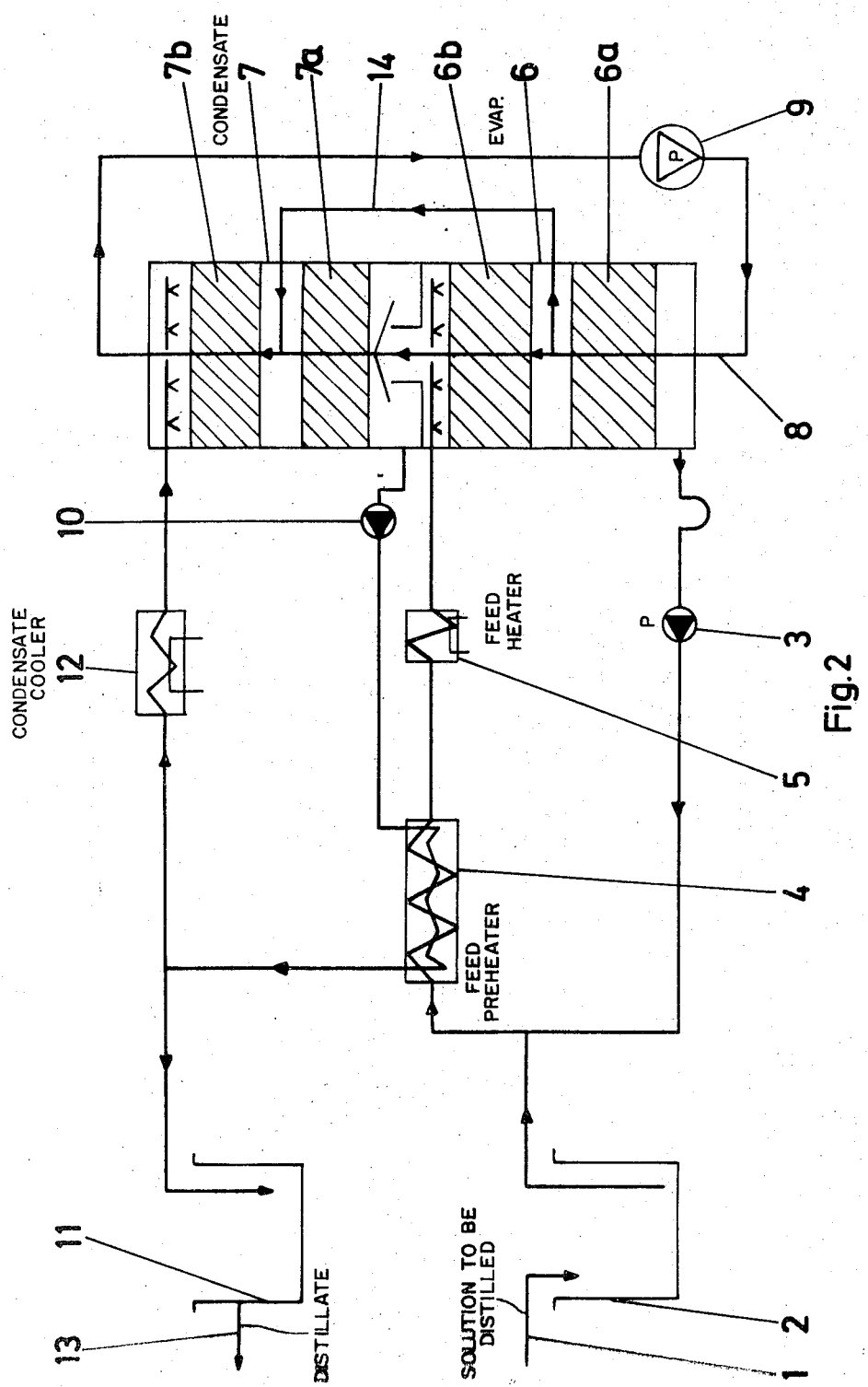
FIG. 2 is a flow diagram according to a second embodiment of the invention.

However, in the embodiment according to FIG. 2 this disadvantage is eliminated.

Here both the evaporator 6 and the condenser 7 are divided in sections in the direction of the gas flow. In the present example each of 6 and 7 has two sections 6a,6b respectively 7a,7b. To divert the gas flow there is between each section a tapping, these tappings being connected with each other by pipes. Thus a tapping after the first section 6a of the evaporator 6 is connected to a tapping before the last section 7b of the condenser 7. When there are more than two sections in the evaporator and the condenser, there is also a tapping after the second section of the evaporator which is connected to a tapping before the last but one section of the condenser and so on.

In this way it is possible to divert from each section (except the last one) of the evaporator part of the gas-steam mixture to the condenser, so that a proper smaller part passes further to the next section. This makes it possible to give the gas from the various sections high temperature and a high degree of saturation and at the same time the exiting liquid is cooled to a low temperature, which means that a good heat economy is achieved. As an example of the magnitude of the gas flows can be mentioned, that in a system containing two sections in each of the evaporator and the condenser and working within the temperature range of 90° – 40° C, 90% of the supplied gas can be diverted after the first section, whereas 10% passes the second section.

What we claim is:

1. A method for the distillation of liquids, comprising warming a first liquid in indirect heat exchange with a second liquid, further warming said first liquid, evaporating a portion of said first liquid in direct contact with a stream of gas thus partially saturating the gas with vapor from said first liquid, condensing a portion of said vapor from said first liquid in said gas in direct contact with said second liquid, removing a portion of said second liquid as distillate, cooling a remaining portion of said second liquid, returning said cooled remaining portion to direct contact with said vapor in said partially saturated gas, withdrawing a portion only of said gas after the beginning but prior to the end of said evaporation step and recombining said withdrawn portion of gas with the remainder of said gas after the beginning but prior to the end of said condensation step.

2. Apparatus for the distillation of liquids, comprising means for warming a first liquid in indirect heat exchange with a second liquid, means for further warming said first liquid, means for evaporating a portion of said first liquid in direct contact with a stream of gas thus partially saturating the gas with vapor from said first liquid, means for condensing a portion of said vapor from said first liquid in said gas in direct contact with said second liquid, means for removing a portion of said second liquid as distillate, means for cooling a remaining portion of said second liquid, means for returning said cooled remaining portion to direct contact with said vapor in said partially saturated gas, means for withdrawing a portion only of said gas after the beginning but prior to the end of said evaporation step, and means for recombining said withdrawn portion of gas with the remainder of said gas after the beginning but prior to the end of said connection step.

* * * * *